United States Patent [19]

Nowicki

[11] 3,728,490

[45] Apr. 17, 1973

[54] POST PAY TELEPHONE PAYSTATION CIRCUIT

[75] Inventor: Jan Nowicki, Komoka, Ontario, Canada

[73] Assignee: Bell-Canada-Northern Electric Research Limited, Ottawa, Ontario, Canada

[22] Filed: Sept. 7, 1971

[21] Appl. No.: 178,052

[52] U.S. Cl. ....................179/6.3
[51] Int. Cl. ....................H04m 17/02
[58] Field of Search ....................179/6.4, 6.3; 194/44

[56] References Cited

UNITED STATES PATENTS 2,041,964 5/1936 Sandalls, Jr. ....................179/6.3
3,022,381 2/1962 Pferd ....................179/6.4
3,579,253 5/1971 Edington ....................179/6.3

*Primary Examiner*—Kathleen H. Claffy
*Assistant Examiner*—Kenneth D. Baugh
*Attorney*—J. E. Mowle

[57] ABSTRACT

A telephone paystation which permits normal dialing to a called party without prior deposit of a coin. When the called party answers, the paystation transmitter circuit is completely disabled by transmitting reverse battery polarity from the central office to the telephone paystation. Normal operation is restored upon deposit of a coin by turning off a controlled rectifier which previously shunted the telephone line at the paystation.

11 Claims, 2 Drawing Figures

POST PAY TELEPHONE PAYSTATION CIRCUIT

FIELD OF THE INVENTION

This invention relates to post pay telephone paystations where a coin is deposited after the called party has answered.

DESCRIPTION OF THE PRIOR ART

In the post pay type of telephone paystation circuit the receiver may be taken off the hook and normal dialing may be effected without first making a coin deposit. When the telephone central office completes a circuit to the person being called (the called party), the line polarity supplied to the paystation of the calling party from the central office battery is reversed to render the voice transmitter inoperative until the appropriate coin deposit. This reversal of the line polarity fed to the calling party at the telephone paystation usually is effected when the called party lifts his receiver to answer the phone. It is also common practice, in addition to disabling the voice transmitter, to attenuate the signal received by the calling party from the called party, when the called party answers the call, until the correct coin deposit has been made.

Previously developed circuit arrangements which incorporate electromagnetic relays and reed switches may be found in Canadian Pats. 779,407 and 824,216 issued on Feb. 27, 1968 and Sept. 30, 1969 respectively in the name of Joseph Thompson. A copending United States continuation-in-part United States application, Ser. No. 278,542 filed on Aug. 7, 1972 in the name of Joseph Thompson et al. describes a circuit in which, aside from the usual dial and switch hook contacts, the only moving mechanical parts are those of a coin actuatable momentary transfer switch (commonly known as a coin switch).

When the line polarity reverses a postpay telephone paystation circuit should inhibit the transmitter while providing a low impedance holding path at the telephone paystation to hold the established call. In addition, the holding path should be arranged such that it is effectively disconnected, once the appropriate coin deposit has been made, in order not to impair transmission and reception at the telephone paystation by loading the telephone line. It is also highly desirable that the telephone paystation circuit be generally insensitive to voltage transients on the telephone line and of a design which will not seriously affect an established call should the circuitry yield to a voltage transient.

The circuits of the preferred embodiments of the invention are ideally suited for long paystation loops as they have a high line holding sensitivity on battery reversal and as they minimize loading of the paystation line once coin deposit has been effected. Additionally, the use of solid state circuitry ensures a low initial cost and a long service life for the telephone paystation.

SUMMARY OF THE INVENTION

It has been found that the normally closed contacts of the coin switch may be used to maintain a network in shunt with the telephone line, so as to hold an established call after the telephone line polarity at the telephone paystation has been reversed by a battery reversal at the central office. In addition to holding an established call, a portion of the line current passing through the shunting network may be diverted to the voice receiver circuit of the paystation (if desired) to provide a reduced voice signal in the voice receiver at the paystation.

When the central office battery potential reverses, a controlled rectifier, which forms part of a shunt network, conducts so as to shunt the line with a low impedance and thereby render the transmitter inoperative. Once a proper coin deposit has been made the aforementioned control rectifier is turned off by the opening of the normally closed or break contacts associated with the coin switch. When the break contacts reclose after passage of a coin, the shunting controlled rectifier remains in its non-conducting state as the loading of the line by the paystation telephone has lowered the potential across the paystation telephone line.

Thus in accordance with the present invention the telephone paystation circuit comprises a voice transmitter circuit and a voice receiver circuit arranged for connection to a telephone line with a first diode in series with the voice transmitter so as to pass line current only when normal battery polarity is applied to the telephone line. A first controlled rectifier is connected in parallel with the first diode with the anode and the cathode of the first controlled rectifier connected to the cathode and anode respectively of the first diode to pass current only in the direction resulting from reverse line polarity.

A low impedance shunt network, arranged to carry line current only when the line polarity is reversed, is connected in shunt with the telephone line through the normally closed contacts of a coin actuatable switch. A portion of the line current carried by the shunt network is applied to the gate of the first controlled rectifier, by a suitable means, so as to turn on the first controlled rectifier when the telephone line polarity is reversed.

As a result of applicant's invention the application of reverse polarity to the telephone line renders the voice transmitter circuit inoperative due to the shunting action of the shunt network until the shunt network is disconnected by a suitable coin deposit. When the shunt network is disconnected the telephone line current flows from one line conductor through the voice receiver and transmitter circuits and through the conducting first controlled rectifier to the other line conductor.

If desired the telephone paystation circuitry may be readily adapted to disable only the voice transmitter circuit or both the voice transmitter and voice receiver circuits until the appropriate coin deposit. Alternatively, if desired, the circuitry of the paystation may be modified to exclude direct current from the central office battery from both the voice receiver and the voice transmitter circuit until the appropriate coin deposit.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
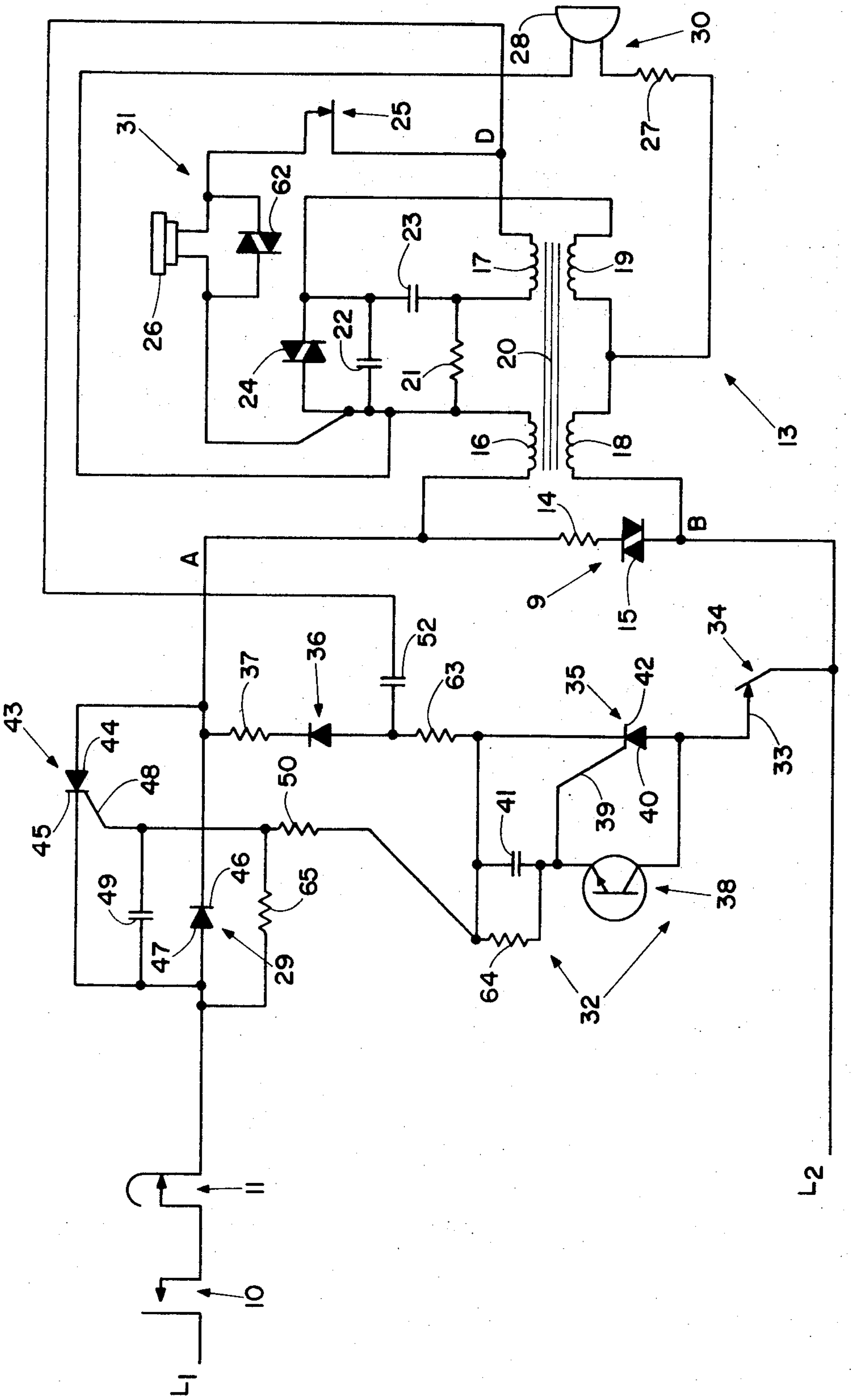
FIG. 1 is a schematic diagram of a post pay telephone circuit illustrating one embodiment in accordance with the present invention.

Referring to FIG. 1, telephone line conductors $L_1$ and $L_2$ lead from a telephone central office (not shown) to a telephone paystation. The potential of $L_1$ being positive with respect to the potential of $L_2$ during operation with normal polarity. During operation with reverse polarity the potential of $L_1$ and $L_2$ reverse from their normal polarities such that $L_2$ is positive with respect to $L_1$.

Normally open switch hook contacts 10 are arranged in series with line conductors $L_1$ to render the telephone paystation inoperative until the switch hook contacts 10 are closed by removing the telephone receiver off the receiver cradle or hook switch (the telephone receiver and the receiver cradle are not shown). Normally closed dial pulse contacts 11 which are also in series with line conductor $L_1$ serve to interrupt the flow of direct current from the central office battery so as to permit normal dialing.

Figure 2:
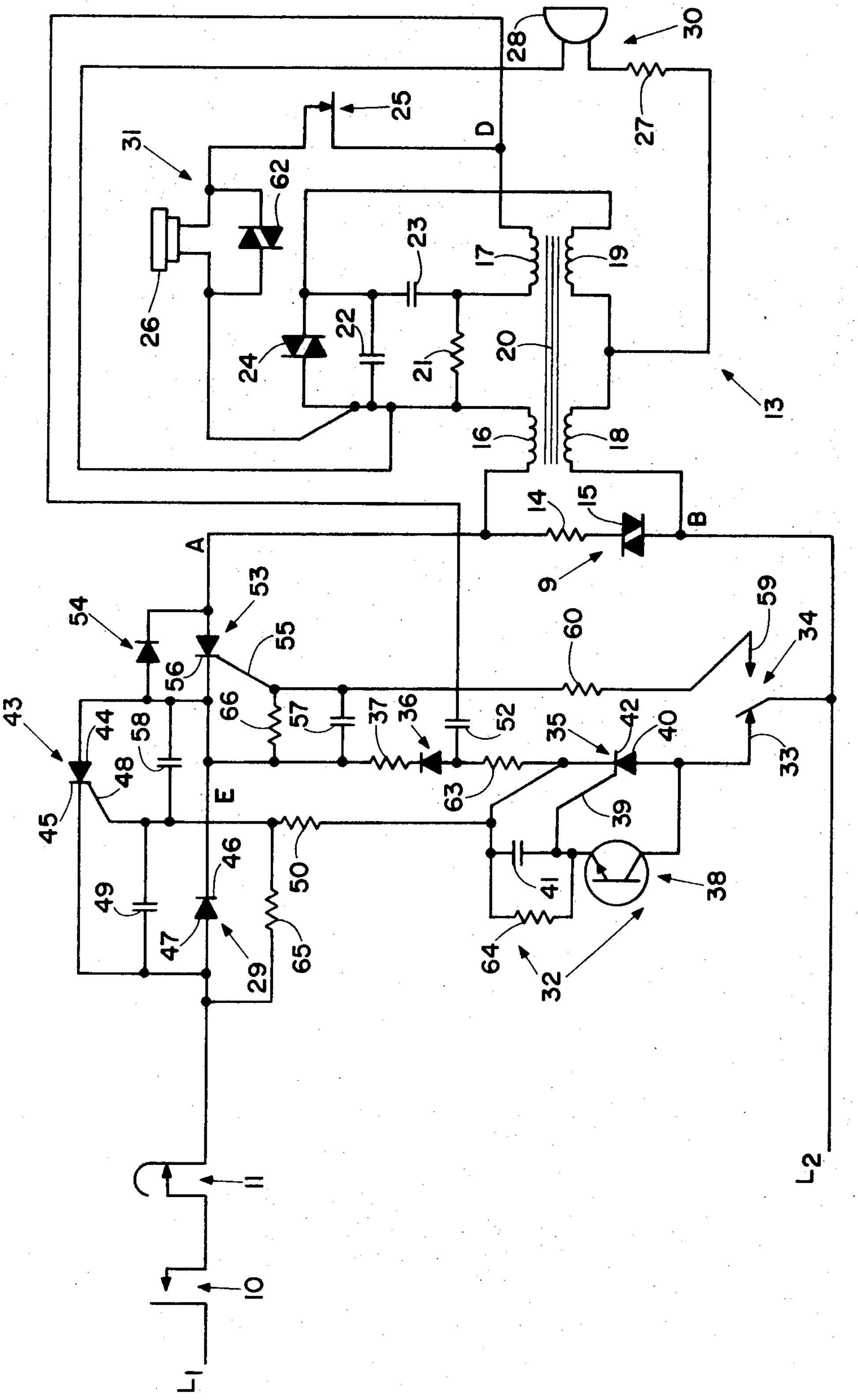
FIG. 2 is a schematic diagram of a semi-post pay telephone circuit which illustrates a second embodiment of the invention. In addition to permitting the called party to be heard before deposit of a coin, this embodiment excludes the central office battery from the voice transmitter and voice receiver circuits prior to deposit of a coin.

A telephone station network 13 which is outlined in FIGS. 1 and 2 to the right of points A, B forms part of the telephone paystation circuitry. As this telephone network circuit 13 is conventional and well known it will only be described briefly.

A resistor 14 in series with a varistor 15 forms a power stabilizing circuit 9 which is connected in shunt with the line at points A,B in the well known manner. Four coils 16, 17, 18 and 19 are transformer windings on a common core 20 arranged to achieve side tone balancing in conjunction with a resistor 21, two capacitors 22, 23 and a varistor 24 in the conventional manner.

Normally closed dial off normal contacts 25, which are in series with a voice receiver 26, prevent dial pulses from being heard in the voice receiver 26 during the dialing operation, while a resistor 27 in series with a voice transmitter 28 serves to limit the current through the voice transmitter 28.

When normal polarity exists on the telephone line (when $L_1$ is positive with respect to $L_2$), a voice transmitter circuit 30 exists through switch hook contacts 10, dial pulse contacts 11, along $L_1$, through a first diode 29 to point A, through coil 16, voice transmitter 28, resistor 27, coil 18 to point B, and thence along line $L_2$ back to the central office. In addition to the voice transmitter circuit 30 an alternate circuit exists from point B to point A through varistor 15 and resistor 14 of the power stabilizing circuit 9.

A voice receiver circuit 31 which is arranged in the conventional manner is fully operative with normal line polarity. The voice receiver circuit 31 includes windings 17, 18; capacitors 22, 23; resistor 21; varistors 24 and 62 and dial-off normal contacts 25.

A shunt network 32 forms part of the novel circuitry which embodies the present invention. As shown in FIG. 1, the shunt network 32 comprises normally closed contacts 33 of a coin actuatable momentary contact switch 34 (hereinafter to be known as coin switch 34) in series with a second controlled rectifier 35, a first shunt resistor 63, a second diode 36, and a second shunt resistor 37.

A selected voltage threshold diode 38 (such as a diac), and a capacitor 41 join the gate 39 of the second controlled rectifier 35 to the anode 40, and the cathode 42, respectively, of the second controlled rectifier 35. A resistor 64 shunts the capacitor 41.

The second controlled rectifier 35 and the second diode 36, are poled in the same direction to conduct current when the normally closed contacts 33 of the coin switch 34 are closed and the telephone line conductor $L_2$ is positive with respect to telephone line conductor $L_1$.

A first controlled rectifier 43 is connected in parallel with the first diode 29 such that the anode 44 and the cathode 45 of the first controlled rectifier 43 are connected to the cathode 46 and the anode 47, respectively, of the first diode 29. The gate 48 of the first controlled rectifier 43 is joined to the cathode 45 of said controlled rectifier 43 through a gate capacitor 49, in shunt with a resistor 65, and furthermore, said gate 48 is connected to the cathode 42 of the second controlled rectifier through a gate resistor 50.

As shown in FIGS. 1 and 2 a coupling capacitor 52 may be used to join the junction of the second diode 36 and the resistor 63 to point D of network 13 if it is intended that the calling party hear the called party prior to depositing a coin.

In normal operation of the telephone paystation (with normal polarity on line conductor $L_1$, $L_2$) telephone line conductor $L_1$ is positive with respect to $L_2$. When the receiver (not shown) is taken off its hook cradle (also not shown) the switch hook contacts 10 close such that line current from the central office (not shown) flows through dial pulse contacts 11, first diode 29, coil 16, voice transmitter 28, resistor 27, winding 18, to telephone line conductor $L_2$. With normal polarity on the telephone line conductor $L_1$ and $L_2$ the voice receiver 26 indicates the presence of dial tone, busy tone and the like as in any conventional private subscriber telephone.

As the dial (not shown) is operated, the dial pulse contacts 11 interrupt the flow of current along telephone lines $L_1$ and $L_2$ to transmit the necessary information to the central office to reach the called party. After the central office senses that the called party has answered, the line polarity sent by the central office to the telephone paystation is reversed, such that telephone line $L_2$ becomes positive with respect to telephone line $L_1$ and the first diode 29 no longer conducts.

When the central office applies reverse polarity to the telephone paystation, the potential across line conductors $L_1$ and $L_2$ rises to the potential of the central office battery as the first diode 29 is reverse biased and as the first control rectifier 43 does not conduct immediately. The potential rise across line conductors $L_1$, $L_2$ breaks over the voltage threshold of the threshold diode, or diac 38 and turns on the second controlled rectifier 35.

When the second controlled rectifier 35 turns on, line current flows through gate resistor 50, to the gate 48 of the first controlled rectifier 43, to turn on the first controlled rectifier 43. The turn on time of the first controlled rectifier 43 is determined, in part, by the time constant of the gate capacitor 49 in conjunction with the gate resistor 50 and resistor 65.

When the first controlled rectifier 43 turns on, line current is shunted from line conductor $L_2$, through second controlled rectifier 35, first shunt resistor 63, second diode 36, and shunt resistor 37, to first controlled rectifier 43, line conductor $L_1$ then back to the central office via the dial pulse 11 and switch hook contacts 10.

The low impedance of the shunt network 32, relative to the input impedance of network 13, as seen from points A, B ensures that negligible line current will flow into the voice transmitter 30 and voice receiver circuits 31 when the second controlled rectifier 35 is conducting. As illustrated in FIGS. 1 and 2, the junction of the anode of the second diode 36 and the first shunt resistor 63 is connected to point D of the voice receiver circuit 31, through a coupling capacitor 52. When the first 43 and second 35 controlled rectifiers are in their conducting states, a voltage develops across second shunt resistor 37 which is fed into the voice receiver circuit 26, through coupling capacitor 52, dial off normal contacts 25, voice receiver 26, and coil 16 in order that the calling party may hear the called party when the called party answers the phone. If desired, capacitor 52 may be removed, in order that the calling party may not hear the called party until the proper coin deposit is effected.

The circuit of FIG. 2 which is a modification of the basic circuit shown in FIG. 1 can be used to completely exclude telephone line current from the voice receiver 31 and voice transmitter 28 circuits.

With reference to FIG. 1, FIG. 2 further includes a third controlled rectifier 53 in series with the first controlled rectifier 43, and a third diode 54 in parallel with the third controlled rectifier 53. The third controlled rectifier 53 and the third diode 54 are poled in the same directions as the first controlled rectifier 43 and the first diode 29 res-pectively.

The gate 55 of the third controlled rectifier 53 is connected to the cathode 56 of the third controlled rectifier 53 through a gate capacitor 57 in shunt with a resistor 66 while the cathode 56 of the third controlled rectifier 53 is connected to the gate 48 of the first controlled rectifier 43 through a capacitor 58. In addition, the gate 55 of the third controlled rectifier 53 is connected to the normally open contact 59 of the coin switch 34 through a resistor 60.

In its operation, the circuit illustrated in FIG. 2 is similar to the circuit of FIG. 1 except that the third controlled rectifier 53 prevents any line current from flowing into the voice receiver 31 and voice transmitter 30 circuits when the telephone line polarity is reversed.

With reference to FIG. 2, when the line polarity reverses, the first 43 and second 35 controlled rectifiers conduct so as to shunt the telephone line and hold the established call. The third controlled rectifier 53 does not conduct however until a suitable coin deposit momentarily closes the normally open contacts 59 of the coin switch 34. When the normally open contacts 59 of the coin switch 34 are closed, line current flows along line conductor $L_2$, through a resistor 60, to the gate 55 of the third controlled rectifier 53 to turn on the third controlled rectifier 53 and thereby establish a low impedance path from point A to the central office along conductor $L_1$.

When the normally closed contacts 33 of the coin switch 34 return to their normally closed position after passage of a coin the shunt network 32 is reconnected across points A, B in FIG. 1 and points B,E in FIG. 2. Because the potential across points A,B or B,E drops below the central office battery supply, to a potential lower than the voltage threshold of the diac 38, due to the loading of the telephone line by the network 13 when the first controlled rectifier 43 is turned on, the second controlled rectifier 35 does not turn on to re-shunt the telephone paystation when the coin switch 34 returns to its normally closed position.

It can be seen that the shunt network 32 serves to hold an established call and to render the transmitter circuit 28 inoperative after the line polarity at the telephone paystation reverses.

Once the proper coin deposit has been made, the establishment of a low impedance path between line conductor $L_1$ and point A in FIGS. 1 and 2, and the effective removal of the shunt network 32 ensures that the telephone paystation will transmit and receive information in the normal manner.

What is claimed is:

1. A post pay telephone paystation circuit of the direct current reversing type, arranged for connection to a telephone line, said paystation circuit, comprising:
   a. a telephone station network, said station network having a voice transmitter circuit and a voice receiver circuit;
   b. a first diode in series with the telephone station network, said diode being poled to pass line current to the voice transmitter circuit only in the direction resulting from normal or non-busy line polarity;
   c. a first controlled rectifier connected in parallel with said diode, the anode and the cathode of the first controlled rectifier being connected to the cathode and anode of the first diode respectively so as to pass current only in the direction resulting from reversed line polarity;
   d. a coin actuatable switch having normally closed or break contacts;
   e. a unidirectional shunt network for conducting line current only when the line polarity is reversed, the shunt network being in series with the normally closed contacts of said switch, said shunt network and normally closed contacts of said switch providing a shunt for the telephone line;
   f. means for applying a portion of the line current carried by the shunt network to the gate of the first controlled rectifier to turn on said controlled rectifier when the telephone line polarity is reversed;
   whereby the voice transmitter circuit is disabled by the application of reverse line polarity until said switch is actuated by a coin deposit to disconnect the shunt network from the telephone line so as to restore transmitter operation at the telephone paystation.

2. The postpay telephone paystation circuit as claimed in claim 1 further comprising:
   an attenuation network connecting the shunt network to the voice receiver circuit to permit a signal on the telephone line to be received by the voice receiver circuit before deposit of a coin, when the telephone line polarity is reversed and the normally closed contacts of said switch are closed.

3. The invention as claimed in claim 1 wherein the shunt network comprises: a second diode and a second controlled rectifier, poled so as to pass current only in the direction resulting from reversed line polarity, and wherein a selected voltage threshold diode is connected between the gate and the anode of the second controlled rectifier.

4. The invention as claimed in claim 2 wherein the shunt network comprises: a second diode and a second controlled rectifier, poled so as to pass current only in the direction resulting from reversed line polarity, and wherein a selected voltage threshold diode is connected between the gate and the anode of the second controlled rectifier.

5. The invention as claimed in claim 1 wherein the shunt network comprises: a second diode and a second controlled rectifier, poled so as to pass current only in the direction resulting from reversed line polarity, the gate and the anode of the second controlled rectifier being joined by a selected voltage threshold diode, and wherein the cathode of the second controlled rectifier is connected to the gate of the first controlled rectifier to apply a portion of the line current carried by the shunt network to the gate of the first controlled rectifier.

6. The invention as claimed in claim 2 wherein the shunt network comprises: a second diode and a second controlled rectifier, poles so as to pass current only in the direction resulting from reversed line polarity, the gate and the anode of the second controlled rectifier being joined by a selected voltage threshold diode, and wherein the cathode of the second controlled rectifier is connected to the gate of the first controlled rectifier to apply a portion of the line current carried by the shunt network to the gate of the first controlled rectifier.

7. The invention as defined in claim 4 wherein the attenuation network comprises a capacitor connecting the anode of the second diode to the voice receiver circuit.

8. The invention as claimed in claim 3 wherein the threshold voltage of the selected voltage threshold diode is greater than the voltage across the telephone line at the telephone paystation when the first controlled rectifier is conducting.

9. The invention as claimed in claim 5 wherein the threshold voltage of the selected voltage threshold diode is greater than the voltage across the telephone line at the telephone paystation when the first controlled rectifier is conducting.

10. The invention as claimed in claim 3 wherein the coin actuatable switch includes normally open contacts and wherein the telephone paystation circuit further includes:

a third diode in series with the first diode and first controlled rectifier, a third controlled rectifier in parallel with the third diode, the third diode and the third controlled rectifier being poled in the same direction as the first diode and first controlled rectifier respectively;

means responsive to closure of the normally open contacts of the coin actuatable switch for turning on the third controlled rectifier;

whereby with reversed line polarity, the first and second controlled rectifier conduct to disable the transmitter and receiver circuits and to hold an established call, until a coin deposit turns off the second, and turns on the third controlled rectifier respectively to permit normal receiver and transmitter operation.

11. The invention as claimed in claim 3 wherein the coin actuatable switch includes normally open contacts and wherein the telephone paystation circuit further includes:

a third diode in series with the first diode and first controlled rectifier, a third controlled rectifier in parallel with the third diode, the third diode and the third controlled rectifier being poled in the same direction as the first diode and first controlled rectifier respectively;

means responsive to closure of the normally open contacts of the coin actuatable switch for turning on the third controlled rectifier;

whereby with reversed line polarity, the first and second controlled rectifier conduct to disable the transmitter and receiver circuits and to hold an established call, until a coin deposit turns off the second, and turns on the third controlled rectifier respectively to permit normal receiver and transmitter operation.

* * * * *